(12) United States Patent
Yu et al.

(10) Patent No.: US 9,618,025 B2
(45) Date of Patent: Apr. 11, 2017

(54) SCREW THREADED FASTENING COMPONENT

(71) Applicant: Shenzhen China Star Optoelectronics Technology Co., Ltd., Shenzhen, Guangdong (CN)

(72) Inventors: Gang Yu, Guangdong (CN); Dehua Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 139 days.

(21) Appl. No.: 14/426,378

(22) PCT Filed: Aug. 27, 2014

(86) PCT No.: PCT/CN2014/085302
§ 371 (c)(1),
(2) Date: Mar. 5, 2015

(87) PCT Pub. No.: WO2016/026162
PCT Pub. Date: Feb. 25, 2016

(65) Prior Publication Data
US 2016/0245321 A1      Aug. 25, 2016

(30) Foreign Application Priority Data

Aug. 22, 2014   (CN) .......................... 2014 1 0419705

(51) Int. Cl.
*F16B 35/00*      (2006.01)
*F16B 12/00*      (2006.01)
(Continued)

(52) U.S. Cl.
CPC ............ *F16B 12/00* (2013.01); *F16B 35/041* (2013.01); *F16B 35/045* (2013.01); *F16B 35/06* (2013.01);
(Continued)

(58) Field of Classification Search
CPC .......... F16B 12/00; F16B 12/14; F16B 35/00; F16B 35/04; F16B 35/06
(Continued)

(56) References Cited

U.S. PATENT DOCUMENTS

| 791,548 | A | * | 6/1905 | Fischer | .................. B21K 1/707 279/83 |
| 866,184 | A | * | 9/1907 | Brison | .................. F16B 35/005 403/362 |

(Continued)

FOREIGN PATENT DOCUMENTS

CN          203291048 U       11/2013

*Primary Examiner* — Roberta Delisle
(74) *Attorney, Agent, or Firm* — Andrew C. Cheng

(57) ABSTRACT

The application provides a screw threaded fastening component, which comprises a stud bolt having an external thread, a first connecting part into which a first screw threaded hole adaptive to the stud bolt is formed, and a second connecting part into which a second screw threaded hole adaptive to the stud bolt is formed, and a threaded direction of the second screw threaded hole is against the threaded direction of the first screw threaded hole. The first connecting part and the second connecting part are assembled on two ends of the stud bolt through the first screw threaded hole and the second screw threaded hole, respectively, and the first connecting part is engaged against the second connecting part when the stud bolt is rotated in a direction. The stud bolt is contained in the first screw threaded hole and the second screw threaded hole when the first connecting part and the second connecting part are engaged completely. The application omits the screw head ordinarily designed in screw threaded connection such that the space is saved and the affection on the appearance of the product caused by the exposed screw head can be prevented.

15 Claims, 6 Drawing Sheets

(51) Int. Cl.
*F16B 35/06* (2006.01)
*F16B 35/04* (2006.01)
*F16B 37/12* (2006.01)
*F16B 33/02* (2006.01)

(52) U.S. Cl.
CPC ...... *F16B 37/125* (2013.01); *F16B 2033/025* (2013.01)

(58) Field of Classification Search
USPC ................ 411/388, 389, 393, 395, 427
See application file for complete search history.

(56) References Cited

U.S. PATENT DOCUMENTS

| | | | | |
|---|---|---|---|---|
| 869,086 A * | 10/1907 | Hoffman | ............... | F16B 35/005 112/221 |
| 1,075,710 A * | 10/1913 | Goodwin | ............. | F16B 35/005 411/393 |
| 1,082,945 A * | 12/1913 | Graham | ................ | F16B 35/042 403/362 |
| 2,295,314 A * | 9/1942 | Whitney | ............... | F16B 35/005 411/393 |
| 2,830,635 A * | 4/1958 | Thorstens | ............. | F16B 39/286 411/259 |
| 2,907,245 A * | 10/1959 | Whitson | ............... | F16B 35/005 411/393 |
| 3,405,592 A * | 10/1968 | Blodee | .................... | F16B 12/24 403/267 |
| 5,511,760 A * | 4/1996 | Kambara | .................. | F16M 7/00 248/188.4 |
| 5,549,431 A * | 8/1996 | Royle | ..................... | B25B 13/54 411/389 |
| 5,647,710 A * | 7/1997 | Cushman | ................ | F16B 35/00 411/389 |
| 6,363,685 B1 * | 4/2002 | Kugler | ............. | E04F 15/02183 52/126.6 |
| 6,584,745 B1 * | 7/2003 | Johansson | ................ | E04B 5/48 248/188.4 |
| 7,320,570 B2 * | 1/2008 | Czarnek | ................ | F16B 35/005 411/392 |
| 7,334,961 B2 * | 2/2008 | Doubler | ................ | F16B 33/006 403/315 |
| 7,883,308 B2 * | 2/2011 | Hung | .................... | F16B 35/005 411/393 |
| 2003/0185648 A1 * | 10/2003 | Blaess | .................... | H01R 4/366 411/393 |

* cited by examiner

SCREW THREADED FASTENING COMPONENT

FIELD OF THE INVENTION

The present invention relates to a connecting component, and more particularly to a screw threaded fastening component without screw head.

BACKGROUND OF THE INVENTION

Screw connection is a common method for fastening two components. Usually, a via hole is set in one of the components while a screw threaded hole is set in another one of the components, and a screw is inserted into and rotational-engaged with the screw threaded hole through the via hole when it is necessary to fasten the two components by using screw thread, and finally, the two components are fastened together due to the effect of the screw head and the screw thread. In the connection method above, space is occupied and appearance of product is affected due to existing of the screw head. Therefore, it is necessary for providing a screw threaded fastening component without screw head.

SUMMARY OF THE INVENTION

According to the drawbacks of the existed technique, the present invention provides a screw threaded fastening component, which comprises:
- a stud bolt having an external thread;
- a first connecting part into which a first screw threaded hole adaptive to the stud bolt is formed; and
- a second connecting part into which a second screw threaded hole adaptive to the stud bolt is formed, and a threaded direction of the second screw threaded hole is against the threaded direction of the first screw threaded hole;
- the first connecting part and the second connecting part being assembled on two ends of the stud bolt through the first screw threaded hole and the second screw threaded hole, respectively, and the first connecting part being engaged against the second connecting part when the stud bolt is rotated in a direction; the stud bolt being contained in the first screw threaded hole and the second screw threaded hole when the first connecting part and the second connecting part are engaged completely.

Wherein, a hex socket is set on a surface of at least one terminal of the stud bolt, and the stud bolt is rotated by a hex driver through the hex socket.

Wherein, a third screw threaded hole is set on a surface of at least one terminal of the stud bolt and is equipped with a screw.

Wherein, a guiding groove for connecting to the first screw threaded hole and a guiding groove for connecting to the second screw threaded hole are set on the first connecting part and the second connecting part, respectively, and an aperture of the guiding groove is greater than the aperture of the first screw threaded hole and the second screw threaded hole.

Wherein, a cross-section of the guiding groove is a circle or a rectangular.

Wherein, a plurality of corresponded aligning holes are set on the first connecting part and the second connecting part, respectively, and the first connecting part and the second connecting part are aligned by a lock assisting jig having a plurality of aligning pins.

Wherein, the aligning holes on the first connecting part and the second connecting part are symmetrically distributed around the first screw threaded hole and the second screw threaded hole.

Wherein, an amount of the aligning holes is 4.

The screw threaded fastening component provided by the embodiment of the present invention omits the screw head ordinarily designed in a screw threaded connection by setting screw threads having opposite direction on the two connecting parts, the two connecting parts engaged against each other from two terminals of the stud bolt, and finally the stud bolt is hidden in the screw threaded holes of the two connecting parts, such that the space is saved and the affection on the appearance of the product caused by the exposed screw head can be prevented.

DETAILED DESCRIPTION OF PREFERRED EMBODIMENTS

Figure 1:
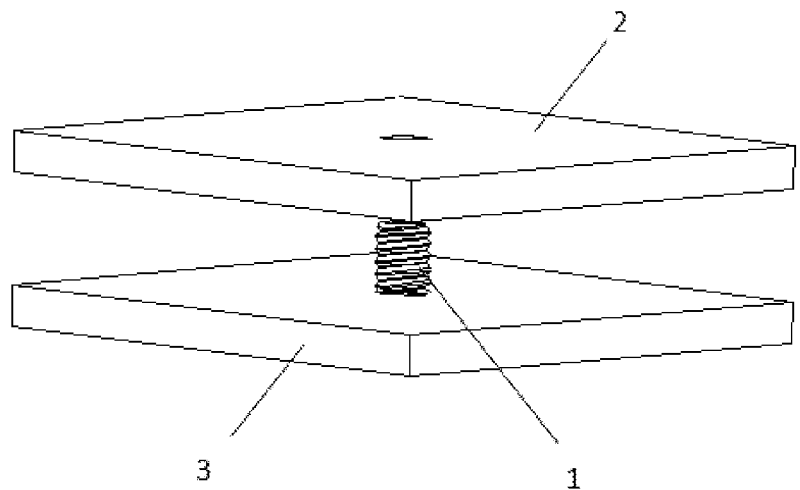
FIG. 1 is a three dimensional diagram before fastening the screw threaded fastening component of the embodiment 1 of the present invention.
Figure 2:
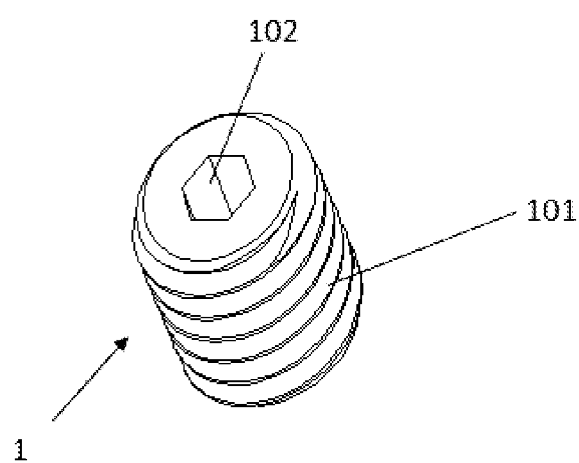
FIG. 2 is a three dimensional diagram of the stud bolt of the embodiment 1 of the present invention.

As described above, the object of the present invention is to provide a screw threaded fastening component without designing a screw head. The screw threaded fastening component comprises: a stud bolt having an external thread; a first connecting part into which a first screw threaded hole adaptive to the stud bolt is formed; a second connecting part into which a second screw threaded hole adaptive to the stud bolt is formed, and a threaded direction of the second screw threaded hole is against the threaded direction of the first screw threaded hole; the first connecting part and the second connecting part being assembled on two ends of the stud bolt through the first screw threaded hole and the second screw threaded hole, respectively, and the first connecting part being engaged against the second connecting part when the stud bolt is rotated in a direction; the stud bolt being contained in the first screw threaded hole and the second screw threaded hole when the first connecting part and the second connecting part are engaged completely. By setting screw threads having opposite direction on the two connecting parts, the two connecting parts engaged against each other from two terminals of the stud bolt, and finally the stud bolt is hidden in the screw threaded holes of the two connecting parts, such that the space is saved and the affection on the appearance of the product caused by the exposed screw head can be prevented.

The present invention is further described below by embodiments combining with the attached drawings.

Embodiment 1

Refer to FIGS. 1-4, the screw threaded fastening component provided by the present embodiment comprises the stud bolt 1, which has an external screw thread 101, and a hex socket 102 is set in the middle of the stud bolt 1 (the hex socket 102 is directly through the surfaces of the two terminals in the present embodiment, but, in other embodiments, the hex socket 102 could be only set on the surface of one terminal of the stud bolt 1 or could be set on the surfaces of the two terminals while being not through the surfaces). The screw threaded fastening component further comprises a first connecting part 2 and a third connecting part 3, wherein a first screw threaded hole 201 and the second screw threaded hole 301 being adaptive to the stud bolt 1 are set on the first connecting part 2 and the second connecting part 3, respectively, and the directions of the screw thread of the first screw threaded hole 201 and the second screw threaded hole 301 are opposite.

Figure 3:
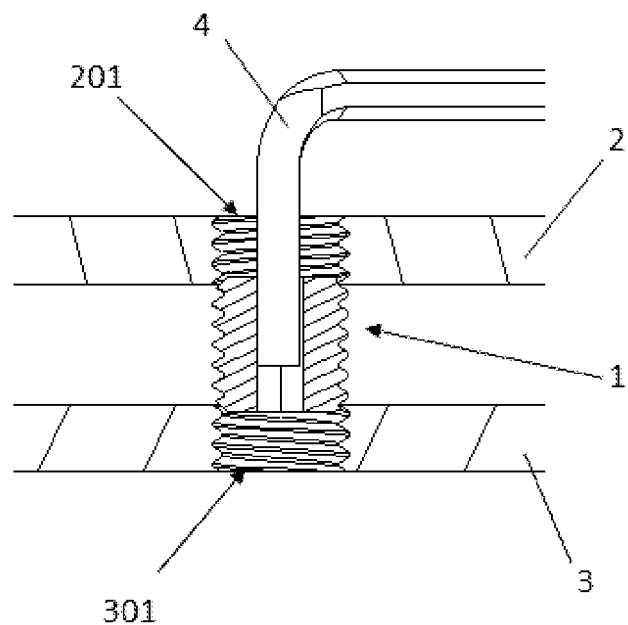
FIG. 3 is a structural schematic diagram during the procedure for fastening the screw threaded fastening component of the embodiment 1 of the present invention.
Figure 4:
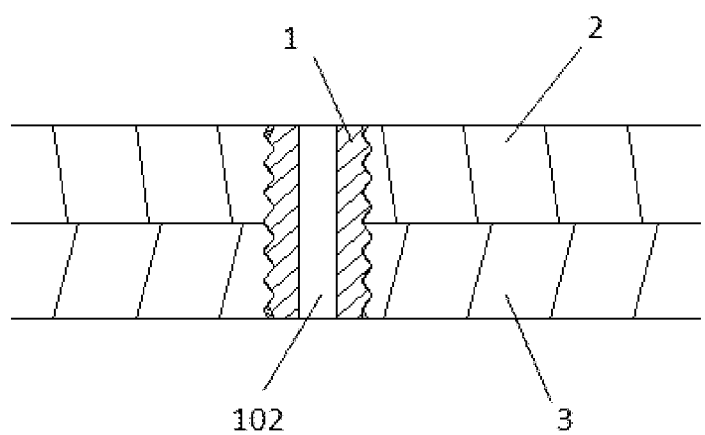
FIG. 4 is a structural schematic diagram after fastening the screw threaded fastening component of the embodiment 1 of the present invention.

As shown in FIG. 3, the first connecting part 2 and the second connecting part 3 are assembled on two terminals of the stud bolt 1 through the first screw threaded hole 201 and the second screw threaded hole 301, respectively. When the stud bolt 1 is rotated in a direction by a hex driver 4 through the hex socket 102, the first connecting part 2 moves against the second connecting part 3, and finally they are engaged together. As shown in FIG. 4, when the first connecting part 2 is completely engaged against the second connecting part 3, the stud bolt is contained in the first screw threaded hole 201 and the second screw threaded hole 301, i.e., the stud bolt 1 does not extrude beyond the surfaces of the first connecting part 2 and the second connecting part 3 such that the stud bolt is hidden in the screw threaded holes of the two connecting parts. The screw head designed in an ordinary screw threaded connection is omitted, such that the space is saved and the affection on the appearance of the product caused by the exposed screw head can be prevented.

Embodiment 2

Figure 5:
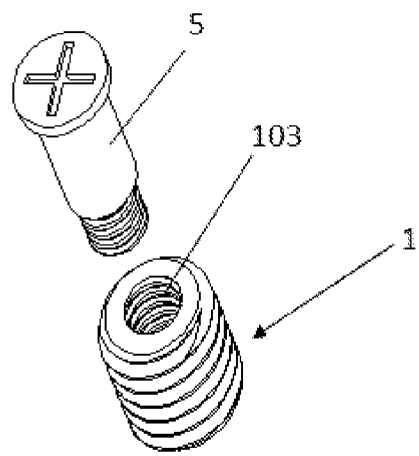
FIG. 5 is a three dimensional diagram of the stud bolt of the embodiment 2 of the present invention.

It is different from the Embodiment 1 that, as shown in FIG. 5, a third screw threaded hole 103 is set in the middle of the stud bolt 1 in the screw threaded fastening component provided in the present embodiment (the third screw threaded hole 103 is directly through the surfaces of the two terminals in the present embodiment, but, in other embodiments, the third screw threaded hole 103 could be only set on the surface of one terminal of the stud bolt 1 or could be set on the surfaces of the two terminals while being not through the surfaces).

Figure 6:
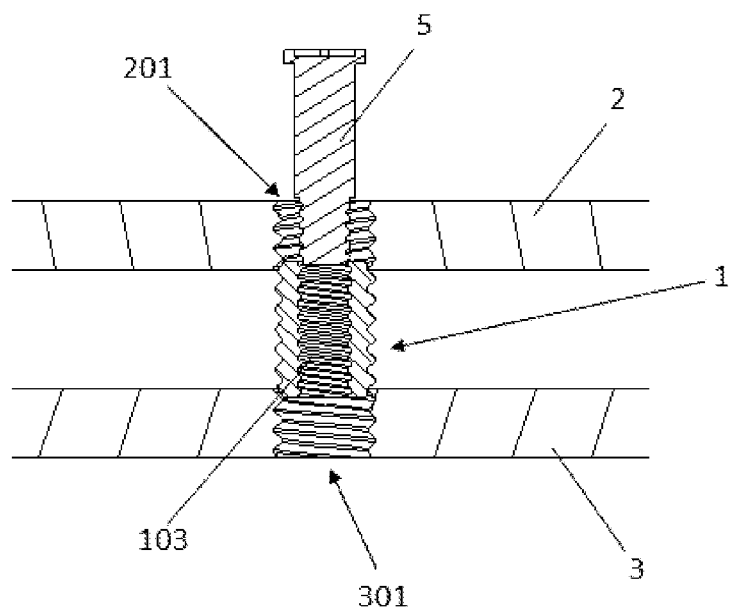
FIG. 6 is a structural schematic diagram during the procedure for fastening the screw threaded fastening component of the embodiment 2 of the present invention.
Figure 7:
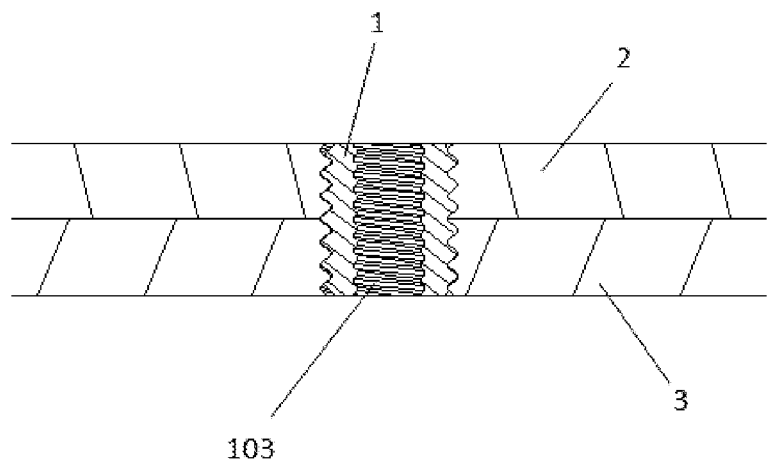
FIG. 7 is a structural schematic diagram after fastening the screw threaded fastening component of the embodiment 2 of the present invention.

In the present embodiment, as shown in FIG. 6, when the fastening component is assembled, the first connecting part 2 and the second connecting part 3 are assembled to the two terminals of the stud bolt 1 respectively through the first screw threaded hole 201 and the second screw threaded hole 301 first, and then the screw 5 is assembled into the third screw threaded hole 103 to lock the screw 5 and the stud bolt 1; the screw 5 is further rotated to drive the stud bolt 1 to rotate such that the first connecting part 2 and the second connecting part 3 are moved close to each other and, finally, engaged together. As shown in FIG. 4, when the first connecting part 2 and the second connecting part 3 are completely engaged, the screw 5 is rotated out from the third screw threaded hole 103. Finally, the stud bolt 1 is contained in the first screw threaded hole 201 and the second screw threaded hole 301, and it is achieved that the stud bolt is hidden in the screw threaded holes of the two connecting parts.

Embodiment 3

Figure 8:
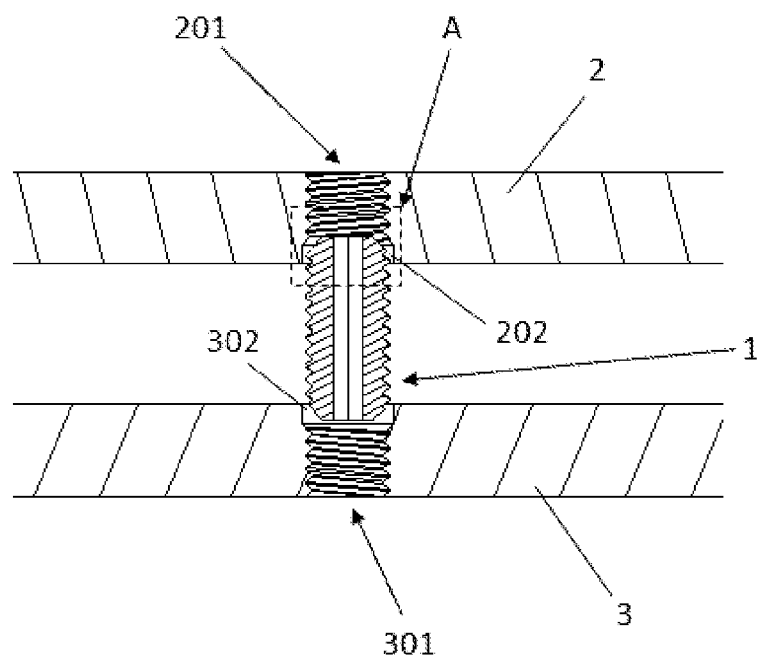
FIG. 8 is a structural schematic diagram during the procedure for fastening the screw threaded fastening component of the embodiment 3 of the present invention.
Figure 9:
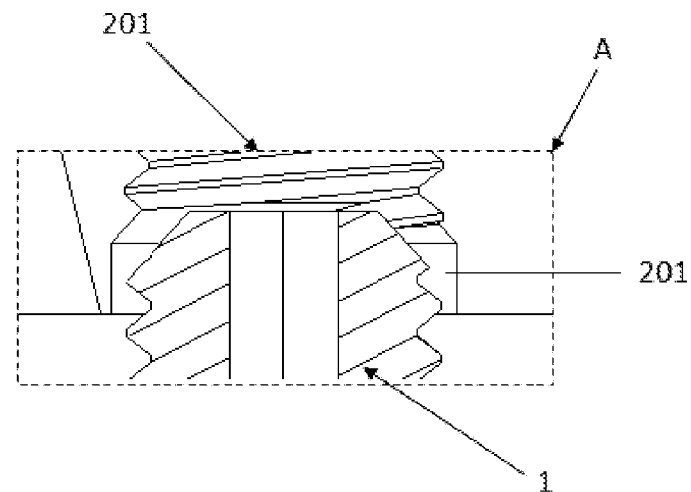
FIG. 9 is an enlarged schematic view of the portion A in FIG. 8.

It is different from the Embodiment 1 that, as shown in FIGS. 8 and 9, guiding grooves 202 and 302 for respectively connecting to the first screw threaded hole 201 and the second screw threaded hole 301 are set on the first connecting part 2 and the second connecting part 3, and an aperture of the guiding grooves 202 and 302 is greater than the aperture of the first screw threaded hole 201 and the second screw threaded hole 301 in the present embodiment. Wherein, the cross-section of the guiding groove can be designed as a circular or a rectangular. When assembly is proceeded, the stud bolt 1 is inserted into the first connecting part 2 and the second connecting part 3 for a distance through the guiding grooves 202 and 302, and then the stud bolt 1 is rotated to engage the first connecting part 2 and the second connecting part 3 in order to prevent the first connecting part 2 and the second connecting part 3 from shifting.

Embodiment 4

Figure 10:
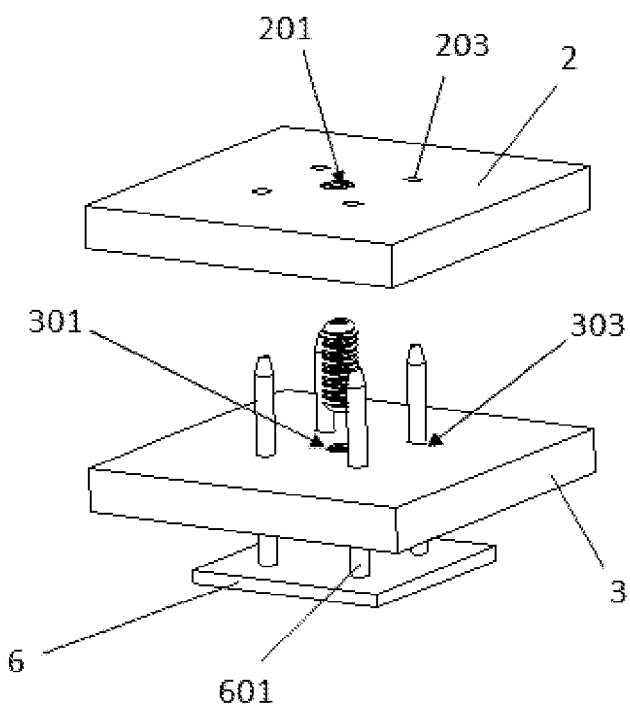
FIG. 10 is a three dimensional diagram before fastening the screw threaded fastening component of the embodiment 4 of the present invention.
Figure 11:
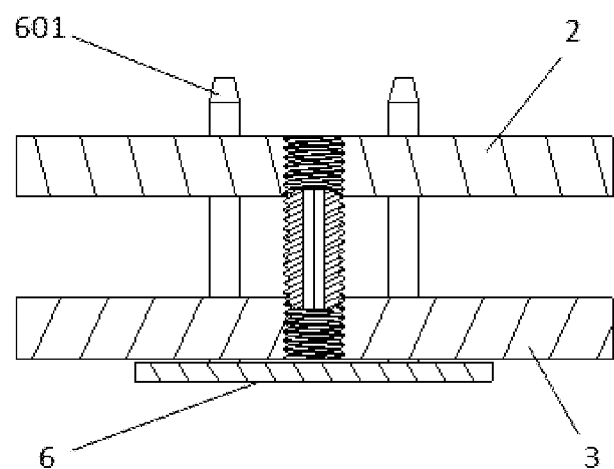
FIG. 11 is a structural schematic diagram during the procedure for fastening the screw threaded fastening component of the embodiment 4 of the present invention.

It is different from the Embodiment 1 that, as shown in FIGS. 10 and 11, a plurality of corresponded aligning holes 203 and 303 set on the first connecting part 2 and the second connecting part 3, respectively, in the present embodiment. When the fastening component is assembled, a lock assisting jig 6 having a plurality of aligning pins 601 is used to pass through the aligning holes 203 and 303 on the first connecting part 2 and the second connecting part 3 for aligning the first connecting part 2 and the second connecting part 3 to ensure that the first connecting part 2 can be vertically engaged with the second connecting part 3 to be prevented from shifting.

In the present embodiment, there are four aligning holes 203 and 303 set on the first connecting part 2 and the second connecting part 3, respectively, and the four aligning holes 203 and 303 are symmetrically distributed around the first screw threaded hole 201 and the second screw threaded hole 301.

It is noted that, in the disclosure, the relative terms such as first and second are only for distinguishing one object or operation from another object or operation, but not for requiring the real relationships or orders between these objects or operations. Furthermore, the terms of "comprising", "including" or other variations are meant to cover nonexclusive including, such that the processes, methods, objects or equipment including a plurality of elements do not only include these elements but also include other elements which are non-obviously listed, or include the basic elements which have to be existed in the processes, methods, objects or equipment. Under the situation of no more limitations, the processes, methods, objects or equipment including an element limited by the term of "comprising a . . . " do not exclude the possibility of other existence of the same element therein.

The description made above is only the embodiment of the present application. It is noted that those with ordinary skill in the technique field could make various modifications and polishes within the theory of the present application, and these modifications and polishes should be deemed as the protection scope of the present application.

What is claimed is:

1. A screw threaded fastening component, comprising:
a stud bolt having an external thread;
a first connecting part into which a first screw threaded hole adaptive to the stud bolt is formed; and
a second connecting part into which a second screw threaded hole adaptive to the stud bolt is formed, and a threaded direction of the second screw threaded hole is against the threaded direction of the first screw threaded hole;
the first connecting part and the second connecting part being assembled on two ends of the stud bolt through the first screw threaded hole and the second screw threaded hole, respectively, and the first connecting part being engaged against the second connecting part when the stud bolt is rotated in a direction; the stud bolt being contained in the first screw threaded hole and the second screw threaded hole when the first connecting part and the second connecting part are engaged completely,
wherein a plurality of guiding grooves for connecting to the first screw threaded hole and the second screw threaded hole respectively are set on the first connecting part and the second connecting part, and an aperture of the guiding grooves is greater than the aperture of the first screw threaded hole and the second screw threaded hole.

2. The screw threaded fastening component according to claim 1, wherein a cross-section of the guiding groove is a circle or a rectangular.

3. A screw threaded fastening component, comprising:
a stud bolt having an external thread;
a first connecting part into which a first screw threaded hole adaptive to the stud bolt is formed; and
a second connecting part into which a second screw threaded hole adaptive to the stud bolt is formed, and a threaded direction of the second screw threaded hole is against the threaded direction of the first screw threaded hole;
the first connecting part and the second connecting part being assembled on two ends of the stud bolt through the first screw threaded hole and the second screw threaded hole, respectively, and the first connecting part being engaged against the second connecting part when the stud bolt is rotated in a direction; the stud bolt being contained in the first screw threaded hole and the second screw threaded hole when the first connecting part and the second connecting part are engaged completely,
wherein a hex socket is set on a surface of at least one terminal of the stud bolt, and the stud bolt is rotated by a hex driver through the hex socket,
wherein a plurality of guiding grooves for connecting to the first screw threaded hole and the second screw threaded hole respectively are set on the first connecting part and the second connecting part, and an aperture of the guiding grooves is greater than the aperture of the first screw threaded hole and the second screw threaded hole.

4. The screw threaded fastening component according to claim 3, wherein a cross-section of the guiding groove is a circle or a rectangular.

5. A screw threaded fastening component, comprising:
a stud bolt having an external thread;
a first connecting part into which a first screw threaded hole adaptive to the stud bolt is formed; and
a second connecting part into which a second screw threaded hole adaptive to the stud bolt is formed, and a threaded direction of the second screw threaded hole is against the threaded direction of the first screw threaded hole;
the first connecting part and the second connecting part being assembled on two ends of the stud bolt through the first screw threaded hole and the second screw threaded hole, respectively, and the first connecting part being engaged against the second connecting part when the stud bolt is rotated in a direction; the stud bolt being contained in the first screw threaded hole and the second screw threaded hole when the first connecting part and the second connecting part are engaged completely,
wherein a plurality of corresponded aligning holes are set on the first connecting part and the second connecting part, respectively, and the first connecting part and the second connecting part are aligned by a lock assisting jig having a plurality of aligning pins.

6. The screw threaded fastening component according to claim 5, wherein the aligning holes on the first connecting part and the second connecting part are symmetrically distributed around the first screw threaded hole and the second screw threaded hole.

7. The screw threaded fastening component according to claim 5, wherein an amount of the aligning holes is 4.

8. A screw threaded fastening component, comprising:
a stud bolt having an external thread;
a first connecting part into which a first screw threaded hole adaptive to the stud bolt is formed; and
a second connecting part into which a second screw threaded hole adaptive to the stud bolt is formed, and a threaded direction of the second screw threaded hole is against the threaded direction of the first screw threaded hole;
the first connecting part and the second connecting part being assembled on two ends of the stud bolt through the first screw threaded hole and the second screw threaded hole, respectively, and the first connecting part being engaged against the second connecting part when the stud bolt is rotated in a direction; the stud bolt being contained in the first screw threaded hole and the second screw threaded hole when the first connecting part and the second connecting part are engaged completely,
wherein a hex socket is set on a surface of at least one terminal of the stud bolt, and the stud bolt is rotated by a hex driver through the hex socket,
wherein a plurality of corresponded aligning holes are set on the first connecting part and the second connecting part, respectively, and the first connecting part and the second connecting part are aligned by a lock assisting jig having a plurality of aligning pins.

9. The screw threaded fastening component according to claim 8, wherein the aligning holes on the first connecting part and the second connecting part are symmetrically distributed around the first screw threaded hole and the second screw threaded hole.

10. The screw threaded fastening component according to claim 9, wherein an amount of the aligning holes is 4.

11. A screw threaded fastening component, comprising:
a stud bolt having an external thread;
a first connecting part into which a first screw threaded hole adaptive to the stud bolt is formed; and
a second connecting part into which a second screw threaded hole adaptive to the stud bolt is formed, and a threaded direction of the second screw threaded hole is against the threaded direction of the first screw threaded hole;
the first connecting part and the second connecting part being assembled on two ends of the stud bolt through the first screw threaded hole and the second screw threaded hole, respectively, and the first connecting part being engaged against the second connecting part when the stud bolt is rotated in a direction; the stud bolt being contained in the first screw threaded hole and the second screw threaded hole when the first connecting part and the second connecting part are engaged completely; wherein, a third screw threaded hole is set on a surface of at least one terminal of the stud bolt and is equipped with a screw,
wherein a plurality of guiding grooves for connecting to the first screw threaded hole and the second screw threaded hole respectively are set on the first connecting part and the second connecting part, and an aperture of the guiding grooves is greater than the aperture of the first screw threaded hole and the second screw threaded hole.

12. The screw threaded fastening component according to claim 11, wherein a cross-section of the guiding groove is a circle or a rectangular.

13. A screw threaded fastening component, comprising:
a stud bolt having an external thread;
a first connecting part into which a first screw threaded hole adaptive to the stud bolt is formed; and
a second connecting part into which a second screw threaded hole adaptive to the stud bolt is formed, and a threaded direction of the second screw threaded hole is against the threaded direction of the first screw threaded hole;
the first connecting part and the second connecting part being assembled on two ends of the stud bolt through the first screw threaded hole and the second screw threaded hole, respectively, and the first connecting part being engaged against the second connecting part when the stud bolt is rotated in a direction; the stud bolt being contained in the first screw threaded hole and the second screw threaded hole when the first connecting part and the second connecting part are engaged completely; wherein, a third screw threaded hole is set on a surface of at least one terminal of the stud bolt and is equipped with a screw,
wherein a plurality of corresponded aligning holes are set on the first connecting part and the second connecting part, respectively, and the first connecting part and the second connecting part are aligned by a lock assisting jig having a plurality of aligning pins.

14. The screw threaded fastening component according to claim 13, wherein the aligning holes on the first connecting part and the second connecting part are symmetrically distributed around the first screw threaded hole and the second screw threaded hole.

15. The screw threaded fastening component according to claim 14, wherein an amount of the aligning holes is 4.

* * * * *